United States Patent [19]
Filter

[11] 3,837,366
[45] Sept. 24, 1974

[54] ELECTRICALLY OPERABLE TRAVELLING-FIELD RACE

[75] Inventor: Claus Filter, Rethem, Aller, Germany

[73] Assignees: Vereinigte Osterreichische Eisen-Und Stahlwerke-Alpine Montan Aktiengesellschaft; Etablissement Wanderfield & Co., Vienna, Austria and Schaan, Liechtenstein

[22] Filed: Sept. 7, 1973

[21] Appl. No.: 395,297

[30] Foreign Application Priority Data
Sept. 15, 1972 Austria .............................. 7915/72

[52] U.S. Cl. .............................................. 139/134
[51] Int. Cl. .......................................... D03d 49/44
[58] Field of Search ................ 310/12; 139/13, 134

[56] References Cited
UNITED STATES PATENTS
2,870,349   1/1959   Rosenberg et al. .............. 139/13 R
3,590,879   7/1971   Basart .............................. 139/123

Primary Examiner—Henry S. Jaudon
Attorney, Agent, or Firm—Kurt Kelman

[57] ABSTRACT

The race has a plurality of length sections and is operable to produce a travelling field adapted to move a movable body along said race so as to partly cover successive ones of said length sections in succession. The race also comprises a polyphase exciter winding having a plurality of polyphase winding sections, which are electrically disconnected from each other and arranged in respective ones of said length sections. Each of said polyphase winding sections consists of a plurality of phase windings. A plurality of capacitors are provided, each of which is connected in parallel to one of said phase windings and adapted to compensate a reactive current flowing in said phase winding. Non-contacting switching means are provided to apply an interlinked polyphase voltage to each of said polyphase winding sections when said body approaches the associated length section of said race and to remove said interlinked polyphase voltage from said winding section in response to the completion of the movement of said body along the associated length section. Said switching means comprise a plurality of thyristors which are connected to respective ones of at least all but one of said phase windings in each of said polyphase winding sections and adapted to be rendered conductive to apply said interlinked polyphase voltage to the associated polyphase winding section, and firing pulse generator means adapted to render each of said thyristors conducting only at a cross over of the interlinked polyphase voltage in the respective phase.

2 Claims, 1 Drawing Figure

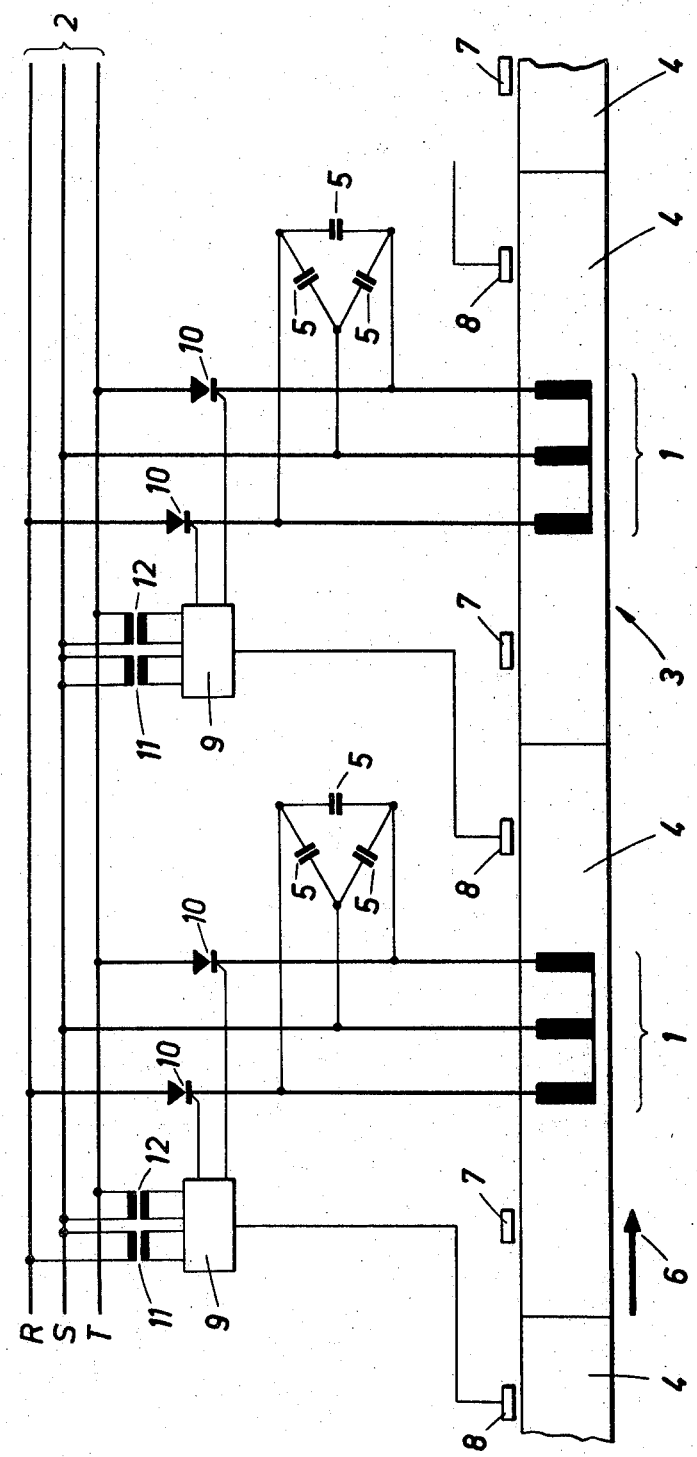

ELECTRICALLY OPERABLE TRAVELLING-FIELD RACE

This invention relates to an electrically operable travelling-field race for moving bodies, such as loom shuttles, which temporarily and partly cover the race, which is provided with a polyphase exciter winding for the travelling field, which exciter winding is at least electrically divided into a plurality of successive sections which are energizable and deenergizable by noncontacting switching means operated by the moving body in dependence on its position.

Electrically operable travelling-field races having continuous exciter windings are not economical, particularly if the races are relatively long, because a relatively high power is required to produce the travelling field throughout the length of the race. Besides, the exciter winding of a long race has an inductance which gives rise to difficulty during a reversal of the polarity of the field because the current loading is relatively high. This difficulty is particularly undesirable in flat weaving machines, where a high picking rate is desired so that the times required to reverse the polarity of the field are to be minimized.

Travelling-field races are known in which the power required to produce the travelling field is substantially independent of the length of the race (U.s Pat. No. 2,630,939). In these known travelling-field races the travelling field is produced by a successive energization of overlapping single-phase d.c. exciter windings rather than by a polyphase exciter winding. The successive energization of the several windings in the order in which they are arranged along the races is effected by one or more rotary switches, which connect the several windings to the power supply system in a predetermined chronological succession. To quench the switching spark, capacitors are provided, which are connected to each current-carrying winding. Whereas these known, electrically operable travelling-field races afford the advantage that the power required to produce the travelling field is independent of the length of the race because the travelling field is produced by a successive energization of several d.c. solenoids, the disadvantages which are involved predominate. They reside in that the shuttle travels at a relatively low speed, the structure is relatively expensive, the arrangement is liable to be deranged, the rotary switches are subjected to wear, and the successive energization of the d.c. solenoids results in non-uniform movement of the shuttle.

In another known travelling-field race the several solenoids are successively energized by the moving shuttle itself rather than by a rotary switch. This concept involves the same disadvantages as the use of rotary switches.

Finally, an electrically operable travelling-field race has been disclosed (French Patent Specification 1,521,402), in which the polyphase exciter winding is divided into a plurality of successive sections so that the travelling field can be produced by the power which is sufficient to excite the sections which produce the magnetic flux which traverses the moving body.

In a travelling-field race which is subdivided into several sections, an additional problem arises because capacitors must be provided to compensate the reactive currents. These capacitors are usually designed for the entire travelling-field race. This is no longer possible in a divided travelling-field race. Besides, an undesired peak voltage may arise when each section is energized.

It is an object of the invention to eliminate these disadvantages and so to design an electrically operable travelling-field race of the kind described first hereinbefore that each energized section is provided with means for compensating the reactive component of the current flowing through said section and the energization of a section cannot give rise to a dangerous peak voltage.

This object is accomplished according to the invention in that each section is energizable by means of thyristors or the like and comprises capacitors which are connected in parallel to the winding and serve to compensate the reactive current, the thyristors are connected in the leads connected to the windings, and each thyristor is adapted to be fired in succession as the interlinked voltage passes through zero in the corresponding phase. Because separate capacitors connected in parallel to the winding are provided for each section, the reactive currents are sufficiently compensated and a particularly economic design results since the capacitors can be connected by short cables so that only a small amount of copper is required.

If these capacitors were arbitrarily connected by switching operations to the power supply system together with the race sections, undesired peak voltages could arise because such switching operations would cause the interlinked voltage to be suddenly applied to the capacitors associated with the respective phases. This could result in a thermal overlaoding of the thyristors and of the semiconductor-protecting means preceding the thyristors. To avoid these disadvantages it is a feature of the invention that the switching thyristors in the several phases of the exciter winding are successively rendered conducting by a firing pulse generator as the interlocked voltage passes through zero in the respective phases. When a section has been energized, the supply voltage is applied to the capacitors as the voltage passes through zero. For this reason the voltage across the capacitors can rise from zero at the supply system frequency without an occurrence of dangerous peak voltages.

A block circuit diagram of an electrically operable travelling-field race according to the invention is shown on the accompanying drawing.

The three-phase a.c. exciter winding of the travelling-field race is divided into successive sections 1, which are electrically separate. Each section 1 is separately connected to a three-phase a.c. power supply system 2. The race 3 is composed of several modular units 4, which are associated with respective exciter winding sections so that travelling-field races of graded lengths can be assembled from identical modular units.

Because the lines of force of the exciting field must traverse the air in a path which is longer than in conventional three-phase a.c. machines, a comparatively large reactive current would flow in the power supply system conductors unless capacitors were provided to compensate the reactive current. These capacitors 5 are preferably arranged in a delta connection and could be connected to each section 1 before the same is connected to the power supply system. The expenditure involved in the switching means will be greatly reduced, however, if separate capacitors are associated with each section 1 so that the expenditure which is due to expensive and delicate switches and the cable length required can be much reduced in this case.

For instance, if a loom shuttle is moved along the race in the direction of the arrow 6 by the travelling field and the shuttle reaches a new race section 4, an inductive or capacitive proximity switch 7 is operated to disconnect the exciter winding section 1 associated with the previously traversed unit 4 from the power supply system in a manner which is not shown. Before leaving a section, the shuttle moves past a second proximity switch 8, which causes the next succeeding exciter winding section to be energized. To avoid strong current transients as an exciter winding section is energized, the phases R, S, T of the power supply system are connected to the winding in succession rather than at the same time, each phase being connected as the interlinked voltage passes through zero in said phase. For this purpose, a firing pulse generator 9 is associated with each section and drives the switching thyristors 10 at the proper times. By means of voltage transformers 11 and 12 the interlinked voltage used to time the firing of the thyristors 10 is applied to the firing pulse generators. Because the potential applied to the sections of the exciter winding is not fixed by a star point ground connection or the like, one phase, in the example shown phase S, may be permanently connected to the power supply system so that switching thyristors are required only for the other phases (R and T). When the shuttle moves past the switch 8 to operate the same, the firing pulse generator 9 is primed and during the next following crossover of the interlinked voltage in each phase drives the corresponding thyristors 10, which are rendered conducting and connect the next following winding section to the power supply system. Because the energization of the several phases is initiated in succession, a voltage is not suddenly applied to the capacitors 5 but the voltages across the capacitors can rise gradually at the power supply system frequency. As a result, there can be no undesired large current transients which could result in a thermal overloading of the thyristors 10 and the semiconductor-protecting means, not shown, which precede said thyristors.

Instead of the firing pulse generators 9 associated with respective sections, a firing pulse generator could be associated with all sections and could transmit the firing pulses for the switching thyristors of each section only when the latter is to be energized.

When the shuttle leaves the section 1, 4 and reaches a new section 1, 4, the section left by the shuttle is de-energized by the switch 7 and the operation is repeated. A second set of proximity switches may be provided for the movement of the shuttle in the opposite direction. When it is desired to avoid four switches for each section, the switches may be disposed in the middle of the length of each section or direction-dependent switches may be used.

What is claimed is:

1. In combination with a movable body, an electrically operable travelling-field race having a plurality of length sections and operable to produce a travelling field adapted to move said body along said race so as to partly cover successive ones of said length sections in succession, said race comprising a polyphase exciter winding having a plurality of polyphase winding sections, which are electrically disconnected from each other and arranged in respective ones of said length sections, each of said polyphase winding sections consisting of a plurality of phase windings, a plurality of capacitors, each of which is connected in parallel to one of said phase windings and adapted to compensate a reactive current flowing in said phase winding, and non-contacting switching means for applying an interlinked polyphase voltage to each of said polyphase winding sections when said body approaches the associated length section of said race and for removing said interlinked polyphase voltage from said winding section in response to the completion of the movement of said body along the associated length section, said switching means comprising a plurality of thyristors which are connected to respective ones of at least all but one of said phase windings in each of said polyphase winding sections and adapted to be rendered conductive to apply said interlinked polyphase voltage to the associated polyphase winding section, and firing pulse generator means adapted to render each of said thyristors conducting only at a crossover of said interlinked polyphase voltage in the respective phase.

2. The combination set forth in claim 1, in which said movable body is a shuttle of a weaving machine.

\* \* \* \* \*